United States Defensive Publication [19] (H) [11] T988,008

Mayer et al. [43] Nov. 6, 1979

[54] COATING AGENTS COMPRISING FLUOROTERPOLYMERS AND POLYARYLENE SULFIDE RESINS

[76] Inventors: Franz Mayer; Gerhard Gebauer, both of Hoechst Aktiengesellschaft, D-6230 Frankfurt am Main 80, Fed. Rep. of Germany

[21] Appl. No.: 161

[22] Filed: Jan. 2, 1979

[51] Int. Cl.[2] ..... C08L 57/08; C08L 65/02; C08L 81/04

[52] U.S. Cl. ..... 525/537; 260/29.2 R; 260/33.2 R; 260/33.4 R; 428/419; 428/422; 428/426; 428/457

[57] ABSTRACT

Coating composition comprising (a) from 98 to 20% by weight of a poly(arylene sulfide) resin, having preferably a melting point between 204° C. and 482° C. and an inherent viscosity from 0.1 to 0.3, determined in chloronaphthalene at 206° C., (b) from 20 to 80% by weight of a terpolymer which contains in copolymerized form 0.5 to 12% by weight of hexafluoropropene, 0.5 to 11% by weight of perfluoro(alkyl vinyl ether), preferably perfluoro(propyl vinyl ether), and tetrafluorethylene, and (c) 40 to 95% by weight, calculated on the total weight of the composition, of a liquid carrier, which is a glycol or glycol ether, an aprotic polar or a non-polar organic solvent or preferably water. Anionic or non-ionic dispersing agents, fillers, pigments and thickeners may optionally be included. Preferred is poly(phenylene sulfide) which is mixed with the liquid carrier and then with the terpolymer in dispersion, suspension or powder form. Compositions are useful for coating metals or non-metallic substrates such as glass or porcelain. Improved adhesion is obtained without pretreating the substrate or without special ingredients. The coating is applied by spraying, dipping or brushing with subsequent heat-treatment.

5 Claims, No Sheets Drawing,

16 Pages Specification

The file of this unexamined application may be inspected and copies thereof may be purchased (849 O.G. 1221, Apr. 9, 1968).